(12) United States Patent
Hwang et al.

(10) Patent No.: US 8,150,197 B2
(45) Date of Patent: Apr. 3, 2012

(54) APPARATUS AND METHOD OF OBTAINING HIGH-RESOLUTION IMAGE

(75) Inventors: Kyu Young Hwang, Suwon-si (KR); Ho Young Lee, Suwon-si (KR); Du-Sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 355 days.

(21) Appl. No.: 12/453,354

(22) Filed: May 7, 2009

(65) Prior Publication Data

US 2010/0182459 A1 Jul. 22, 2010

(30) Foreign Application Priority Data

Jan. 20, 2009 (KR) .................. 10-2009-0004512

(51) Int. Cl.
*H04N 9/68* (2006.01)
*H04N 5/208* (2006.01)
*G06K 9/40* (2006.01)

(52) U.S. Cl. ............... 382/263; 348/235; 348/252

(58) Field of Classification Search ............ 348/218.1, 348/235, 252; 382/263
See application file for complete search history.

(56) References Cited

U.S. PATENT DOCUMENTS 5,131,057 A 7/1992 Walowit et al.
5,227,789 A * 7/1993 Barry et al. ............... 341/65
5,835,637 A * 11/1998 Houchin et al. ........... 382/254
2010/0074549 A1 * 3/2010 Zhang et al. ............. 382/263

FOREIGN PATENT DOCUMENTS

| EP | 1018705 | 7/2000 |
| KR | 10-0311481 | 5/2001 |
| KR | 10-0504594 | 1/2005 |
| KR | 10-2005-0088674 | 9/2005 |
| KR | 10-2007-0119879 | 12/2007 |

OTHER PUBLICATIONS

"Space Scale Analysis for Image Sampling and Interpolation", Ford G.E. et al., Speech Processing 1. San Francisco, Mar. 23-26, 1992.
"Grey Image Enlargement With Edge Enhancement", Cheng-Hsiung Hsieh et al., Proceedings of the Seventh International Conference on Machine Learning and Cybernetics, Kunming, Jul. 12-15, 2008.
"Image Expansion Using Interpolation & Heuristic Edge Following", Atwood et al., International Conference on Image Processing and its Applications, London, GB, Jan. 1, 1989, pp. 664-668.
European Search Report dated Apr. 27, 2010 issued in corresponding European Patent Application No. 09159815.1.

* cited by examiner

*Primary Examiner* — Timothy J Henn
(74) *Attorney, Agent, or Firm* — Staas & Halsey LLP

(57) ABSTRACT

An apparatus and method of obtaining a high-resolution image are provided. The apparatus of obtaining a high-resolution image may generate a high frequency component of an output image using a high frequency component of an input image, synthesize the input image and the generated high frequency component of the output image, and thereby may obtain a sharpness-enhanced high-resolution image.

33 Claims, 16 Drawing Sheets

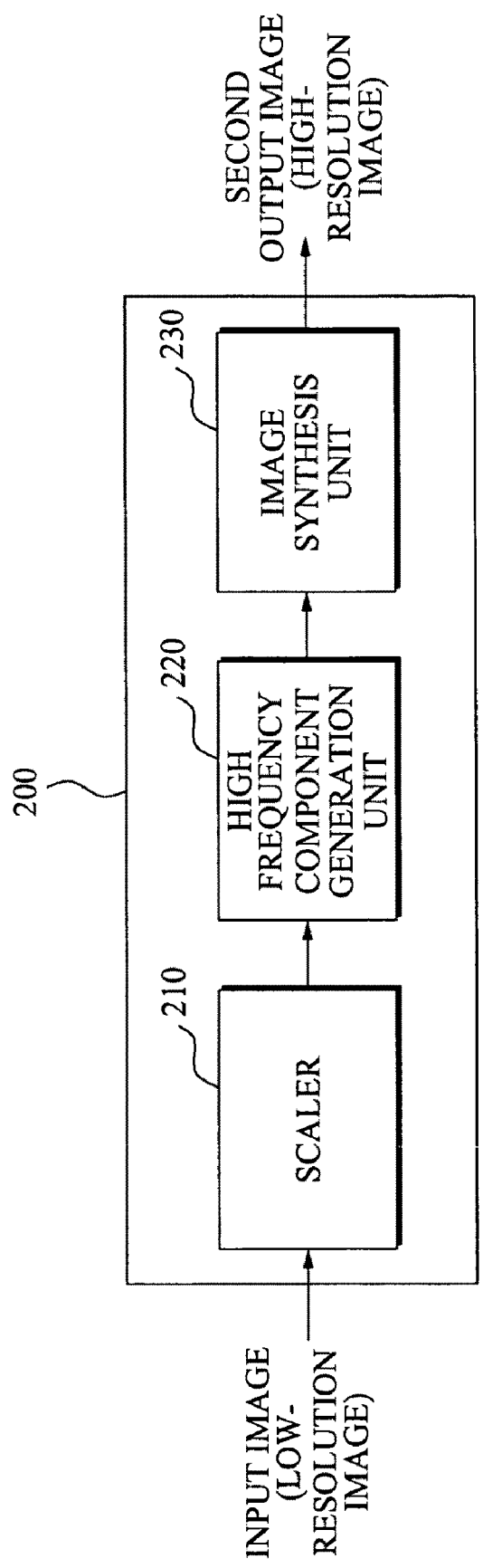

APPARATUS AND METHOD OF OBTAINING HIGH-RESOLUTION IMAGE

CROSS-REFERENCE TO RELATED APPLICATIONS

This application claims the priority benefit of Korean Patent Application No. 10-2009-0004512, filed on Jan. 20, 2009, in the Korean Intellectual Property Office, the disclosure of which is incorporated herein by reference.

BACKGROUND

1. Field

Exemplary embodiments relate to an apparatus and method of obtaining a high-resolution image, and more particularly, to an apparatus and method of obtaining a high-resolution image that may obtain an enhanced high-resolution image without using additional data.

2. Description of the Related Art

With the development of display technologies, a display device may become larger and support a high-resolution.

In the case of obtaining an image to be displayed on a large display device using a digital camera or a digital video recorder, there may be difficulty in obtaining a high-resolution image due to an optical limit caused by miniaturization of a camera, namely, a limit of spatial resolution caused by an insufficient number of pixels of a charge-coupled device (CCD)/complementary metal-oxide semiconductor (CMOS) image sensor and size variation during compressing/storing/transmitting of a recorded image. Accordingly, a high-resolution image enhancement algorithm through signal analysis may be developed to obtain a high-resolution image with respect to the recorded image.

As an existing method for obtaining a high-resolution image from a low-resolution image, there is an interpolation method using a scaler. The interpolation method assigns proper data values to pixels that do not have an assigned pixel value to improve resolution of an image.

However, an interpolation method is based on a linear interpolation, and thereby may cause a low sharpness of an image and a blur.

SUMMARY

According to exemplary embodiments, there may be provided an apparatus of obtaining a high-resolution image, the apparatus including: a scaler to scale an input image and generate a first output image; a high frequency component extraction unit to extract a first high frequency component of the first output image from the input image; a high frequency component generation unit to generate a second high frequency component of the first output image based on the first high frequency component; and an image synthesis unit to synthesize the first output image and the second high frequency component and generate a second output image.

The high frequency component extraction unit may scale a high frequency component of the input image to extract the first high frequency component.

The high frequency component generation unit may estimate a ratio between a magnitude of the first high frequency component and a magnitude of the second high frequency component based on the first high frequency component, and generate the second high frequency component based on the ratio.

According to other exemplary embodiments, there may be provided an apparatus of obtaining a high-resolution image, the apparatus including: a scaler to scale an input image and generate a first output image; a high frequency component generation unit to extract a first high frequency component from the first output image, and generate a second high frequency component of the first output image based on the first high frequency component; and an image synthesis unit to synthesize the first output image and the second high frequency component and generate a second output image.

According to exemplary embodiments, there may be provided a method of obtaining a high-resolution image, the method including: scaling an input image and generating a first output image; extracting a first high frequency component of the first output image from the input image; generating a second high frequency component of the first output image based on the first high frequency component; and synthesizing the first output image and the second high frequency component and generating a second output image.

According to other exemplary embodiments, there may be provided a method of obtaining a high-resolution image, the method including: scaling an input image and generating a first output image; extracting a first high frequency component from the first output image, and generating a second high frequency component of the first output image based on the first high frequency component; and synthesizing the first output image and the second high frequency component and generating a second output image.

Additional aspects, and/or advantages will be set forth in part in the description which follows and, in part, will be apparent from the description, or may be learned by practice of the embodiments.

BRIEF DESCRIPTION OF THE DRAWINGS

These and/or other aspects will become apparent and more readily appreciated from the following description of exemplary embodiments, taken in conjunction with the accompanying drawings of which:

FIG. 2 illustrates a configuration of an apparatus of obtaining a high-resolution image according to other exemplary embodiments;

FIGS. 3A through 3I illustrate a relationship between a Laplacian signal and a sharpness of an image according to exemplary embodiments;

DETAILED DESCRIPTION

Figure 1:
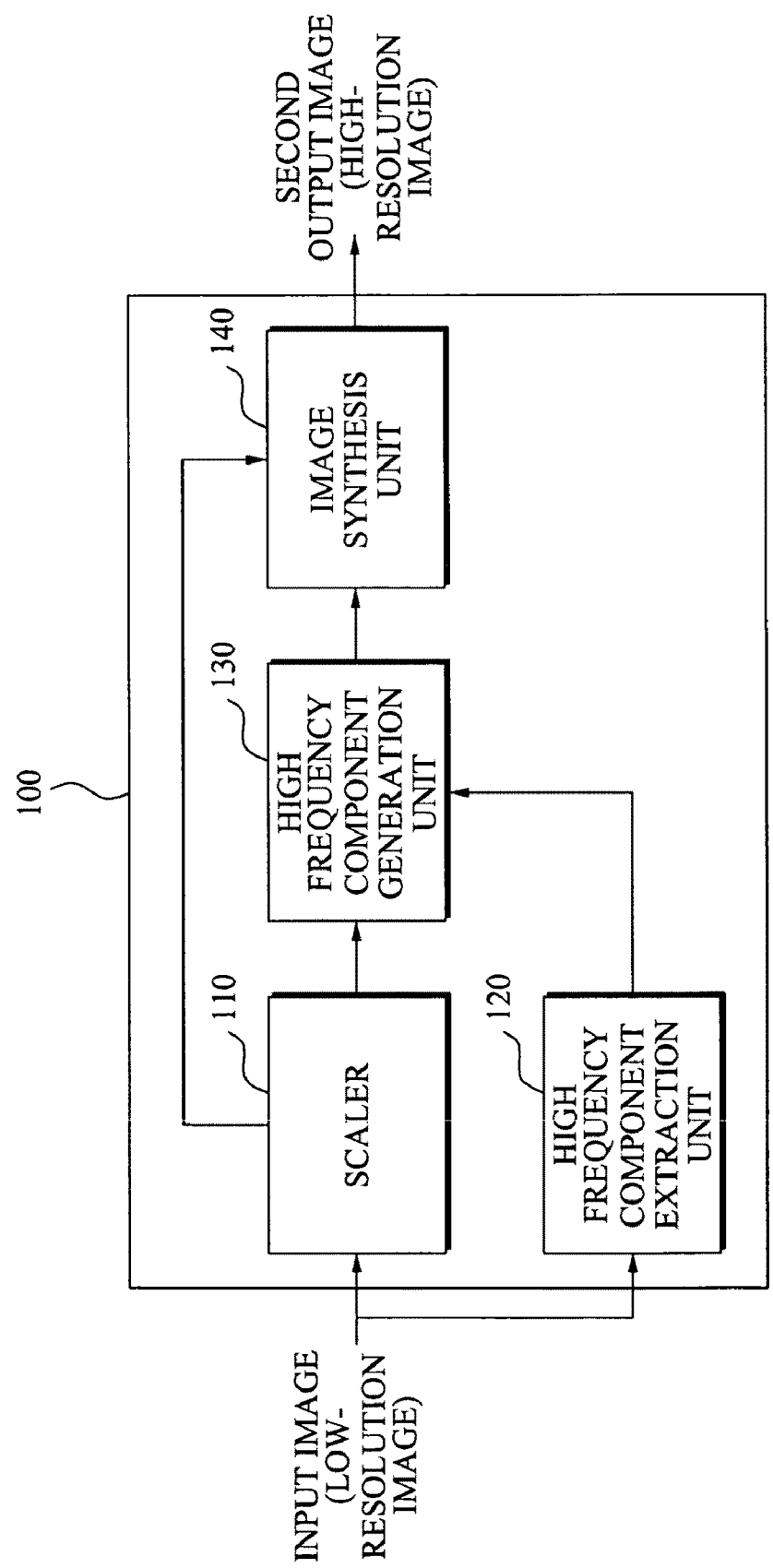
FIG. 1 illustrates a configuration of an apparatus of obtaining a high-resolution image according to exemplary embodiments.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 illustrates a configuration of an apparatus 100 of obtaining a high-resolution image according to exemplary embodiments.

According to exemplary embodiments, the apparatus 100 of obtaining a high-resolution image may include a scaler 110, a high frequency component extraction unit 120, a high frequency component generation unit 130, and an image synthesis unit 140, which are described in detail below.

The scaler 110 may scale an input image and generate a first output image.

In image signal processing, scaling may indicate increasing a number of pixels of an image. That is, the first output image may be a high-resolution image in comparison to the input image. In this instance, a number of spatial frequency regions may increase to be up to the increased number of pixels.

For example, the scaler 110 may generate the resolution-enhanced first output image using an interpolation method.

When the first output image is generated using the interpolation method, the scaler 110 may not use all the increased spatial frequency regions and may process only spatial frequency components of the input image. Accordingly, the generated first output image may be the high-resolution image where a high frequency component is insufficient.

The high frequency component extraction unit 120 may extract a high frequency component of the first output image from the input image. Hereinafter, the high frequency component extracted from the input image is referred to as a first high frequency component.

According to exemplary embodiments, the high frequency component extraction unit 120 may extract and scale the high frequency component of the input image, and thereby may extract the first high frequency component.

For example, the high frequency component extraction unit 120 may extract the high frequency component from the input image using a low pass filter (LPF). In this instance, the extraction of the high frequency component using the LPF may be performed based on, $$I_H = I - \text{LPF}(I) \quad \text{[Equation 1]}$$

where I, $I_H$, and LPF( ) may denote the input image, the high frequency component of the input image, and low pass filtering, respectively.

That is, the high frequency component extraction unit 120 may extract a low frequency component LPF(I) of the input image I by low pass filtering the input image I. Also, the high frequency component extraction unit 120 may extract the high frequency component $I_H$ of the input image I using a difference between the input image I and the extracted low frequency component LPF(I) of the input image I.

Also, the high frequency component extraction unit 120 may scale the extracted high frequency component $I_H$ of the input image I, and thereby may extract the first high frequency component.

A high frequency component of an image may include various signal components of high frequency regions. For example, the high frequency component of the image may include a Laplacian signal. The Laplacian signal may be a second derivative of a pixel value of the image.

According to exemplary embodiments, the first high frequency component may include a first Laplacian signal.

In this instance, the high frequency component extraction unit 120 may extract a Laplacian signal from an input signal using a kernel or mask corresponding to the following Equation 2:

$$M = \begin{bmatrix} 0 & -1 & 0 \\ -1 & 4 & -1 \\ 0 & -1 & 0 \end{bmatrix}, \quad \text{[Equation 2]}$$

where M may denote a Laplacian kernel or mask.

Then, the high frequency component extraction unit 120 may scale the extracted Laplacian signal of the input signal, and thereby may extract the first Laplacian signal.

The high frequency component generation unit 130 may generate a second high frequency component of the first output image based on the first high frequency component.

Since the first high frequency component may be associated with the high frequency component extracted from the input image, a high-resolution image may not be obtained using only the first high frequency component. Accordingly, the high frequency component generation unit 130 may generate a second high frequency component where a signal in a high frequency region is enhanced in comparison to the first high frequency component.

In this instance, the high frequency component generation unit 130 may generate the second high frequency component using the first high frequency component. That is, the high frequency component generation unit 130 may generate a high frequency component for resolution enhancement, that is, the second high frequency component, using only data included in a current image, without using additional data as in a reconstruction-based super-resolution algorithm or an example-based super-resolution algorithm.

According to exemplary embodiments, the high frequency component generation unit 130 may estimate a ratio between a magnitude of the first high frequency component and a magnitude of the second high frequency component based on the first high frequency component. Hereinafter, the ratio is referred to as a magnitude ratio. Also, the high frequency component generation unit 130 may generate the second high frequency component based on the estimated magnitude ratio.

Since the first high frequency component and the second high frequency component are a high frequency component of a single image, the magnitude of the first high frequency component may be proportional to the magnitude of the second high frequency component. Accordingly, the high frequency component generation unit 130 may estimate the magnitude ratio between the magnitude of the first high frequency component and the magnitude of the second high frequency component, and generate the second high frequency component based on the estimated magnitude ratio.

In this instance, according to exemplary embodiments, the high frequency component generation unit 130 may multiply the estimated magnitude ratio with the first high frequency component, extracted by the high frequency component extraction unit 120, and thereby may extract the second high frequency component. In this instance, the magnitude ratio may be determined by, $$r = \frac{\text{MAGNITUDE OF ESTIMATED SECOND HIGH FREQUENCY COMPONENT}}{\text{MAGNITUDE OF ESTIMATED FIRST HIGH FREQUENCY COMPONENT}}, \quad \text{[Equation 3]}$$

where r may denote the magnitude ratio.

The image synthesis unit 140 may synthesize the first output image and the second high frequency component and generate a second output image.

As described above, the first output image may be an image with a low sharpness due to insufficient high frequency components. Accordingly, the image synthesis unit 140 may synthesize the first output image and the second high frequency component, generated by the high frequency component generation unit 130, and thereby may generate the second output image where a high frequency component is enhanced. The second output image may be a final output image with respect to the input image.

Accordingly, the apparatus 100 of obtaining a high-resolution image may obtain a high-resolution image corresponding to the low-resolution input image.

As described above, a high frequency component of an image may include a Laplacian signal. Accordingly, the first high frequency component may include the first Laplacian signal and the second high frequency component may include a second Laplacian signal.

Hereinafter, it is described in detail that the high frequency component of the image includes the Laplacian signal with reference to FIGS. 3A through 3I and FIGS. 4A through 4C.

FIGS. 3A through 3I illustrate a relationship between a Laplacian signal and a sharpness of an image according to exemplary embodiments.

Figure 3A:
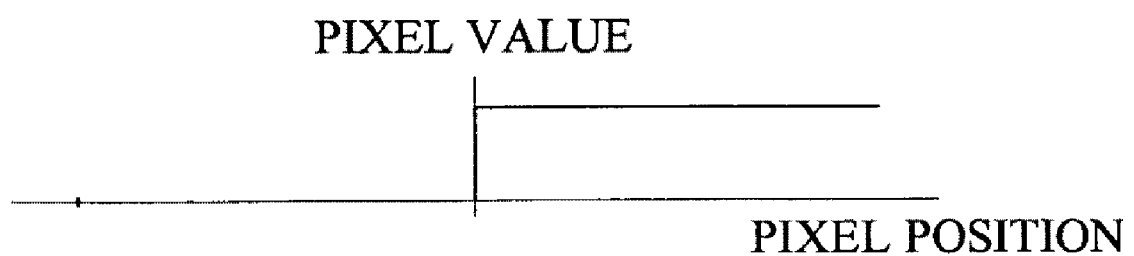

FIG. 3A illustrates a graph of a relationship between a pixel position of the image and a pixel value. FIGS. 3B through 3E illustrate graphs of a relationship between a pixel position and a Laplacian signal value.

The pixel position may be a same pixel position in FIGS. 3A through 3E. That is, FIGS. 3A through 3E illustrate graphs of the pixel value and the Laplacian signal value of a particular portion of the image according to the pixel position.

In FIG. 3A, a point where the pixel value significantly changes may be an edge in the image.

Also, FIGS. 3B through 3E illustrate graphs associated with Laplacian signals with respect to images having different sharpness. In this instance, an image associated with FIG. 3B may have a highest sharpness, and an image associated with FIG. 3C may have a lower sharpness than the image of FIG. 3B. Also, an image associated with FIG. 3D may have a lower sharpness than the image of FIG. 3C, and an image associated with FIG. 3E may have a lower sharpness than the image of FIG. 3D.

Figure 3B:
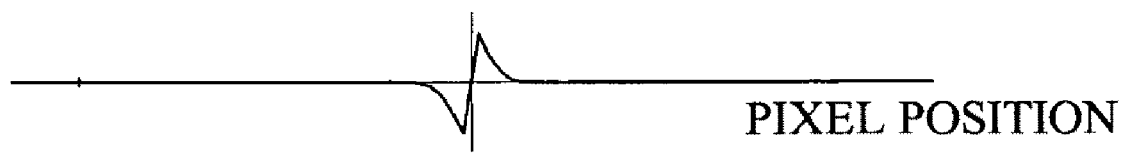
Figure 3C:
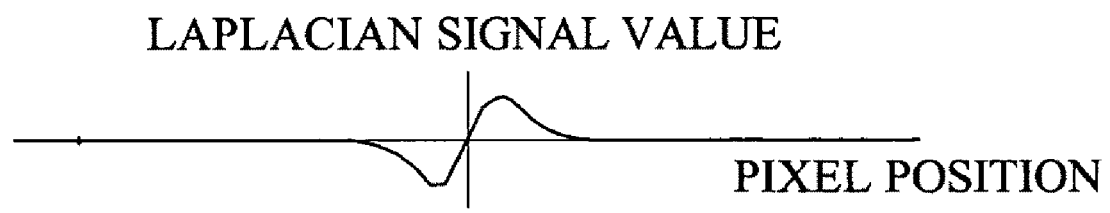
Figure 3D:
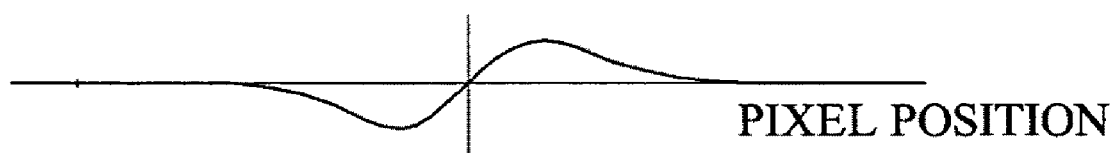
Figure 3E:
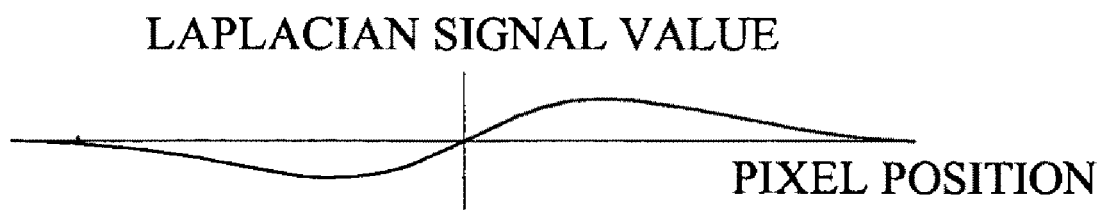
Figure 3F:
Figure 3G:
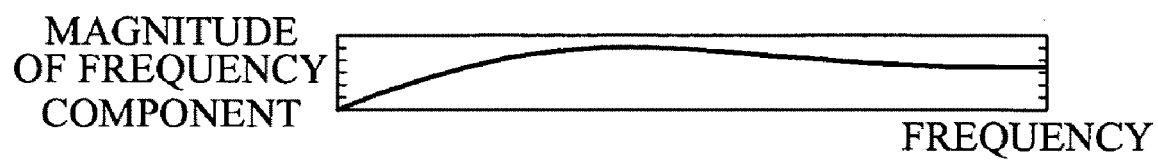
Figure 3H:
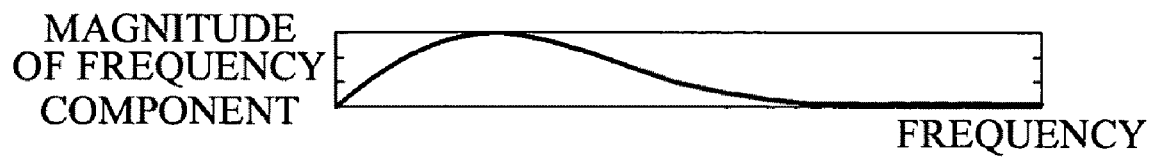
Figure 31:
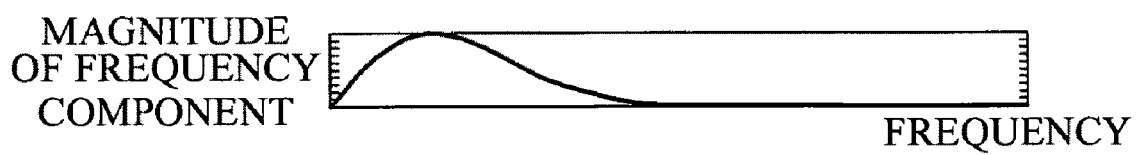

FIG. 3F may illustrate a frequency spectrum graph of the image having the Laplacian signal of FIG. 3B. Similarly, FIGS. 3G through 3I may illustrate frequency spectrum graphs of images having the Laplacian signals of FIGS. 3C through 3E, respectively.

As shown in FIGS. 3F through 3I, as a sharpness of an image increases, a magnitude of a frequency component included in a high frequency band may increase. That is, a proportion of a high frequency component of an image is to be increased to increase a sharpness of the image.

As shown in FIGS. 3B through 3E, as the sharpness of the image increases, a variation of the Laplacian signal value in an edge may be different, although a location of a zero crossing of the Laplacian signal may be maintained. The zero crossing of the Laplacian signal may occur in the edge. That is, as the sharpness of the image increases, a slope of the Laplacian signal value in the edge may increase, and thus the Laplacian signal may have a relatively sharp shape. Here, the edge may indicate a region including an edge pixel and neighboring pixels adjacent to the edge pixel.

That is, although the zero crossing of the Laplacian signal may occur in the edge of the image regardless of the sharpness of the image, the Laplacian signal in the edge may have a relatively sharp shape as the sharpness of the image increases.

The apparatus 100 of obtaining a high-resolution image according to exemplary embodiments may control the Laplacian signal value in the edge of the low-resolution image, and thereby may change a shape of the Laplacian signal to be sharp. Thus, a high-resolution image with a great sharpness may be obtained.

Figure 4A:
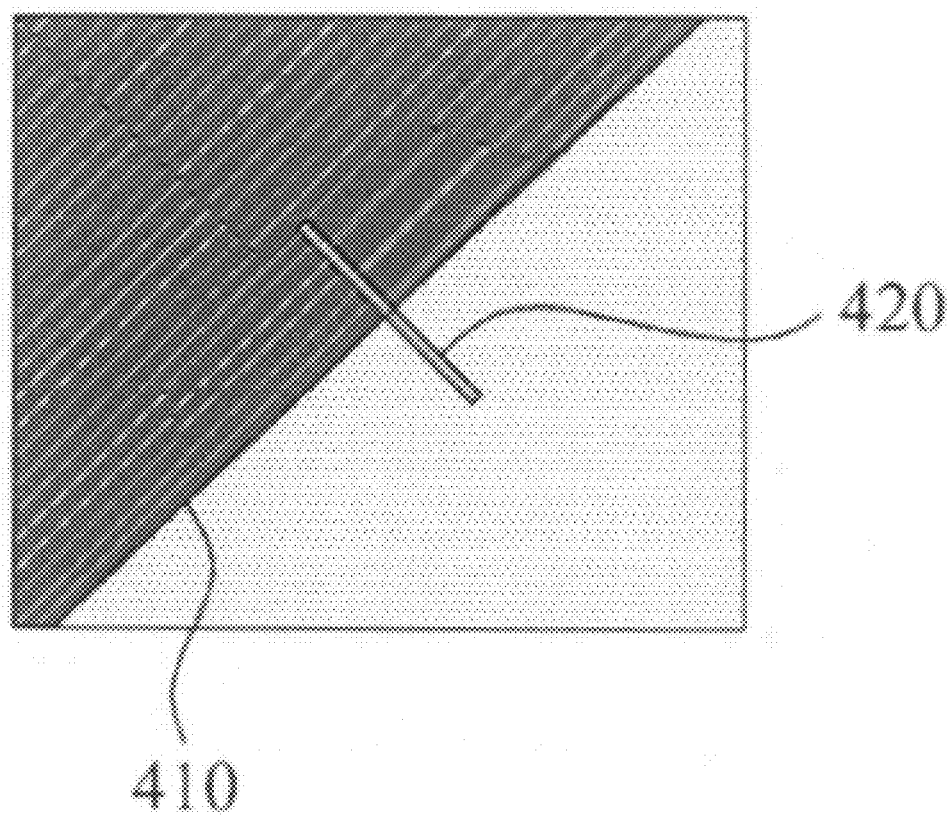
FIGS. 4A through 4C illustrate a relationship between a gradient component and a sharpness of an image according to exemplary embodiments.
Figure 4B:
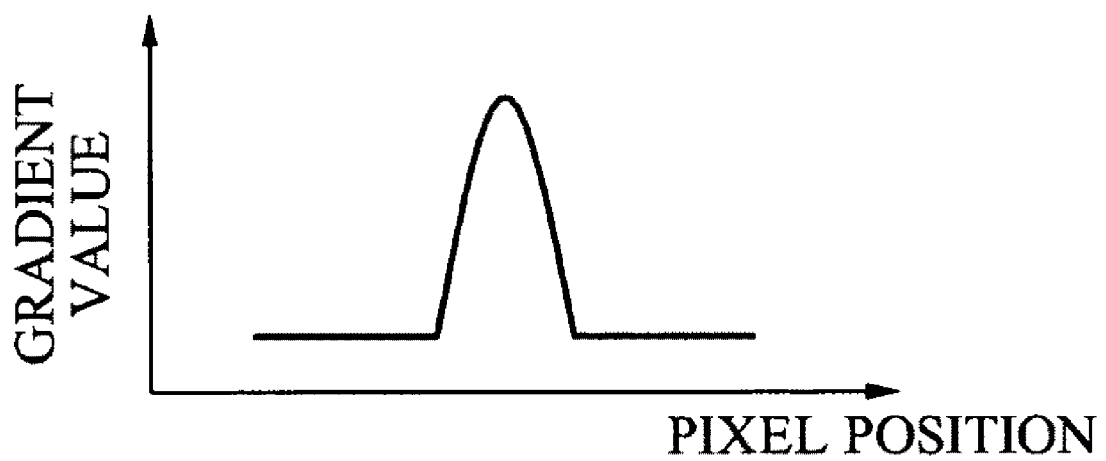
Figure 4C:
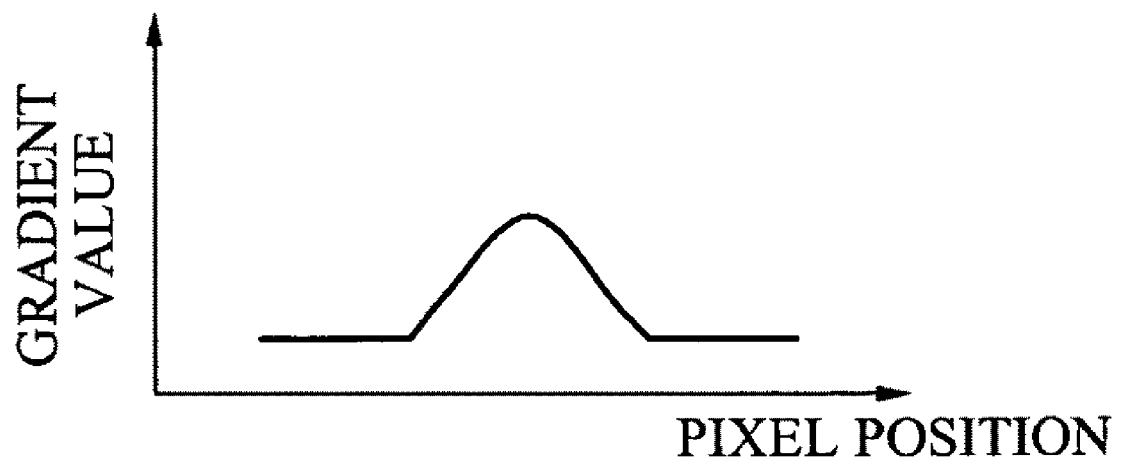

FIGS. 4A through 4C illustrate a relationship between a gradient component and a sharpness of an image according to exemplary embodiments.

FIG. 4A illustrates a particular portion of the image (hereinafter, referred to as 'image'). An edge 410 of the image is illustrated in FIG. 4A.

FIGS. 4B and 4C illustrate graphs of distributions of gradient values of an edge in the image according to a direction of a gradient path 420. The direction of the gradient path 420 may be vertical to the edge 410.

FIG. 4B illustrates a graph of a distribution of gradient values of an edge of an image with a great sharpness. FIG. 4C illustrates a graph of a distribution of gradient values of an edge of an image with a low sharpness.

As shown in FIGS. 4B and 4C, the distribution of gradient values of the edge may be represented as a Gaussian distribution that has a pixel position of the edge as an average. Also, as a sharpness of the image increases, the distribution of the gradient values of the edge may have a sharp shape. That is, as the sharpness of the image increases, a variance value of the distribution of the gradient values may decrease.

In this instance, since a gradient component may indicate a slope of pixel values, the gradient component may be extracted through a first-order differentiation of the pixel value. Also, since the Laplacian signal may be a second derivative of the pixel value, the Laplacian signal may be extracted by differentiating the gradient component.

As described above, since the gradient distribution in the edge may have a shape of the Gaussian distribution, the gradient distribution in the edge may model the gradient component of the image as the Gaussian distribution.

In this instance, the Gaussian distribution modeled in the edge may be modeled using a variance value of the gradient distribution in the edge. An average of the modeled Gaussian distribution may correspond to a pixel position value of the edge.

As described above, the Laplacian signal, which is a high frequency component of the image, may be extracted by differentiating the gradient component, and the gradient distribution in the edge may be modeled as the Gaussian distribution. Accordingly, the high frequency component generation unit 130 may estimate the ratio between the magnitude of the first high frequency component and the magnitude of the second high frequency component using the modeled Gaussian distribution.

Accordingly, the high frequency component generation unit 130 may generate a first Gaussian distribution by modeling the gradient distribution based on the variance value of the gradient distribution. In this instance, the variance value of the gradient distribution may be extracted from the edge of the first output image. Also, the high frequency component generation unit 130 may generate a second Gaussian distribution using the first Gaussian distribution. Accordingly, the high frequency component generation unit 130 may estimate the magnitude ratio based on the first Gaussian distribution and the second Gaussian distribution. In this instance, the first Gaussian distribution may have a first variance value and the second Gaussian distribution may have a second variance value.

As described above, the Laplacian signal may be extracted by differentiating the gradient component. Thus, according to exemplary embodiments, the magnitude ratio may be a ratio between a derivative of the first Gaussian distribution and a derivative of the second Gaussian distribution.

Hereinafter, an operation of the high frequency component generation unit 130 is described in greater detail.

The high frequency component generation unit 130 may detect the gradient distribution from the edge of the first output image, and obtain a variance value of the detected gradient distribution.

According to exemplary embodiments, the gradient distribution of the edge of the first output image may be generated based on a gradient map of the first output image and an edge map of the first output image.

The gradient map may be generated by a gradient map generation unit (not shown) included in the high frequency component generation unit 130. The edge map may be generated by an edge map generation unit (not shown) included in the high frequency component generation unit 130.

The gradient map generation unit may generate a horizontal gradient and a vertical gradient of the first output image when generating the gradient map.

A gradient magnitude of the horizontal axis may be generated using a difference kernel or a Sobel mask. A gradient magnitude of the vertical axis may be generated using a mask where the difference kernel or the Sobel mask, used when generating the gradient magnitude of the horizontal axis, is transposed.

The gradient map generation unit may generate the gradient magnitude and a gradient angle using the generated horizontal gradient and the generated vertical gradient according to the following Equation 4 and Equation 5:

$$|G| = \sqrt{G_x^2 + G_y^2},$$ [Equation 4]

$$\angle G = \tan^{-1}\left(\frac{G_y}{G_x}\right),$$ [Equation 5]

where |G| may denote the gradient magnitude, ∠G may denote the gradient angle, $G_x$ may denote the horizontal gradient, and $G_y$ may denote the vertical gradient.

The edge map generation unit may determine whether an edge for each pixel exists when generating the edge map. In this instance, the edge map generation unit may use the first Laplacian signal included in the first high frequency component to determine whether the edge for each pixel exists. That is, when zero-crossing occurs in the first Laplacian signal, it may be determined that an edge exists in a corresponding pixel.

In this instance, since the edge map generation unit may make an erroneous determination due to noise, the generated gradient map may be used to determine whether the edge for each pixel exists. Accordingly, the edge map generation unit may determine whether an edge exists with respect to only a pixel where the gradient magnitude is equal to or greater than a threshold value. Thus, an error of the determination may be reduced.

The edge map generation unit may determine an orientation in an edge pixel position using the gradient angle value of the generated gradient map. Also, the edge map generation unit may accurately generate the edge map at every sub-pixel unit using the orientation and whether the edge exists.

The high frequency component generation unit 130 may detect the gradient distribution in the edge using the generated gradient map and the generated edge map, and obtain the variance value of the detected gradient distribution.

That is, the high frequency component generation unit 130 may detect the gradient distribution in the edge using the gradient magnitude, included in the gradient map, and the orientation in the edge pixel position included in the edge map.

Since a gradient path exists for each edge pixel, a single gradient path may correspond to a single edge. Accordingly, the variance value of the gradient distribution, detected based on the gradient path, may be matched with an edge pixel corresponding to the gradient path. Therefore, it may be interpreted that the variance value of the gradient distribution may exist for each edge pixel. Hereinafter, a variance value of a gradient distribution detected according to a gradient path including a particular edge pixel is referred to as a gradient variance value of an edge pixel.

Here, the variance value of the gradient distribution in the edge and a distance between a pixel of the gradient path and the edge pixel are required to generate the first Gaussian distribution. Accordingly, the high frequency component generation unit 130 may store the gradient distribution in the edge in a form of a gradient profile. Therefore, a distance between a corresponding pixel and the edge pixel and a gradient variance value of the edge pixel corresponding to the gradient path may be stored in the gradient profile. In this instance, the corresponding pixel is included in the gradient path.

The high frequency component generation unit 130 may retrieve an edge pixel having a minimum Euclidean distance to the corresponding pixel to determine which gradient path includes the corresponding pixel. A gradient path corresponding to the retrieved edge pixel may be the gradient path including the corresponding pixel.

The high frequency component generation unit 130 may calculate the gradient variance value of the edge pixel at every sub-pixel unit and the distance between the corresponding pixel and the edge pixel to improve an accuracy of the gradient profile. In this instance, the gradient variance value of the edge pixel may be calculated by, $$\sigma = \sqrt{\sum_{x \in p(x_0)} m'(x)d^2(x, x_0)},$$ [Equation 6]

where σ may denote the gradient variance value of the edge pixel, m'(x) may denote a probability distribution of the gradient magnitude, x may denote a position of the corresponding pixel, $x_0$ may denote a position of a sub-pixel in the corresponding pixel, $d^2(x, x_0)$ may denote the distance between the corresponding pixel to the edge pixel, and p may denote the gradient path. The probability distribution of the gradient magnitude may be determined by, $$m'(x) = \frac{|G|(x)}{\sum_{s \in p(x_0)} |G|(s)}.$$ [Equation 7]

After obtaining the variance value of the gradient distribution of the edge of the first output image, the high frequency component generation unit 130 may generate the first Gaussian distribution by modeling the gradient distribution using the obtained variance value of the gradient distribution. In this instance, an average of the first Gaussian distribution may be a position value of the edge pixel, and the variance value of the first Gaussian distribution may be the obtained variance value.

Also, the high frequency component generation unit 130 may determine a second variance value based on the first variance value, and generate the second Gaussian distribution. The second Gaussian distribution may have the second variance value and have the position value of the edge pixel as an average.

As described above, as the variance value of the gradient distribution in the edge decreases, a sharpness of an image may be enhanced. According to exemplary embodiments, the second variance value may be less than the first variance value. That is, the high frequency component generation unit 130 may arbitrarily select any one from values less than the first variance value, and determine the selected value as the second variance value.

The operation of the high frequency component generation unit 130 that generates the first Gaussian distribution and the second Gaussian distribution has been described above.

According to exemplary embodiments, the first Gaussian distribution and the second Gaussian distribution may be a generalized Gaussian distribution (GGD).

Accordingly, the gradient distribution in the edge may be modeled as the GGD. In this instance, the first Gaussian distribution may correspond to a first GGD, and the second Gaussian distribution may correspond to a second GGD.

The GGD modeling the gradient distribution in the edge may be represented as, $$GGD(d, \sigma, \lambda) = \frac{\lambda \alpha(\lambda)}{2\sigma \Gamma\left(\frac{1}{\lambda}\right)} \exp\left[-\left(\alpha(\lambda)\left|\frac{d}{\sigma}\right|^\lambda\right)\right],$$ [Equation 8]

where GGD( ), d, $\sigma$, $\lambda$, and $\Gamma$( ) may denote a function of GGD, the distance to the edge pixel, the variance value, a parameter for shape determination of the GGD, and a gamma function, respectively. $\alpha(\lambda)$ may be given by $$\alpha(\lambda) = \sqrt{\Gamma\left(\frac{3}{\lambda}\right)\Big/\Gamma\left(\frac{1}{\lambda}\right)}.$$

In this instance, when an input image is a natural image, $A\lambda$ may have a value of 1.6. The gradient distribution in the edge may be modeled as a GGD having $\sigma$ as a variable. Accordingly, the high frequency component generation unit 130 may model the gradient distribution in the edge as the first GGD by applying the variance value of the gradient distribution in the edge to Equation 8.

Also, the high frequency component generation unit 130 may generate the second variance value by changing the first variance value of the first GGD, and generate the second GGD by applying the second variance value to Equation 8.

In this instance, the high frequency component generation unit 130 may determine the magnitude ratio using the first GGD and the second GGD. As described above, since the Laplacian signal included in the high frequency component may be extracted by differentiating the gradient component, the magnitude ratio may be determined using Equation 8 and the following Equation 9:

$$r(d) = \frac{GGD(d+\Delta, \sigma_2) - GGD(d-\Delta, \sigma_2)}{GGD(d+\Delta, \sigma_1) - GGD(d-\Delta, \sigma_1)},$$ [Equation 9]

where $\sigma_1$ and $\sigma_2$ may denote the variance value of the first GGD and the variance value of the second GGD, respectively. Also, the high frequency component generation unit 130 may generate the second Laplacian signal by multiplying the first Laplacian signal with r(d).

FIG. 2 illustrates a configuration of an apparatus 200 of obtaining a high-resolution image according to other exemplary embodiments.

The apparatus 200 of obtaining a high-resolution image may include a scaler 210, a high frequency component generation unit 220, and an image synthesis unit 230.

The scaler 210 may scale an input image and generate a first output image.

The high frequency component generation unit 220 may extract a first high frequency component from the first output image, and generate a second high frequency component of the first output image based on the first high frequency component.

That is, the high frequency component generation unit 220 may directly extract the first high frequency component from the first output image.

In this instance, the high frequency component generation unit 220 may extract the first high frequency component by applying the first output image to Equation 1 or applying the first output image to a kernel corresponding to Equation 2.

The image synthesis unit 230 may synthesize the first output image and the second high frequency component and generate a second output image.

Here, the scaler 210, the high frequency component generation unit 220, and the image synthesis unit 230 of the apparatus 200 of obtaining a high-resolution image may correspond to the scaler 110, the high frequency component generation unit 130, and the image synthesis unit 140 of the apparatus 100 of obtaining a high-resolution image, respectively. Accordingly, detailed descriptions excluding the extraction of the first high frequency component by the high frequency component generation unit 220 may be omitted herein.

Figure 5:
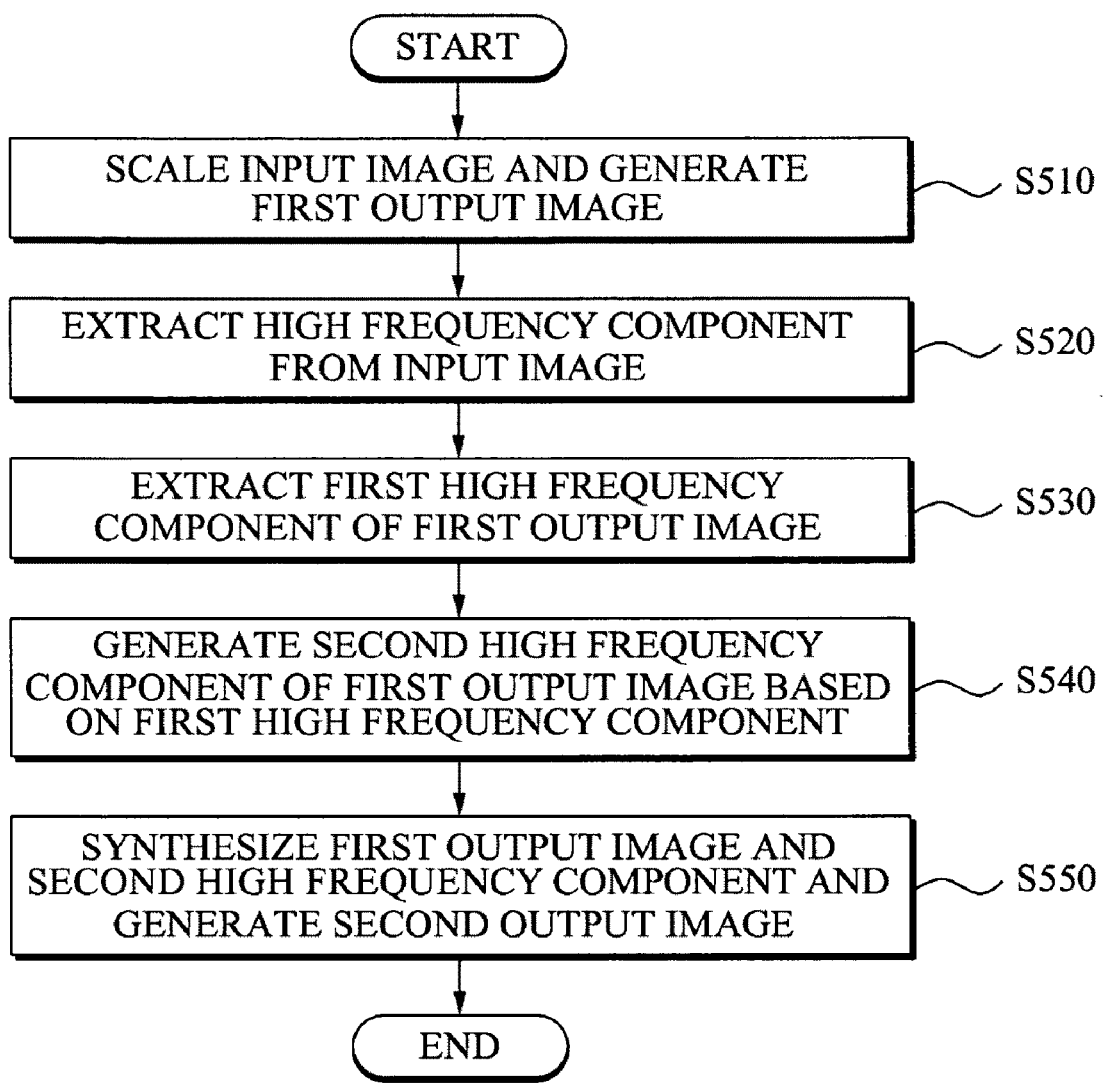
FIG. 5 illustrates a flowchart of a method of obtaining a high-resolution image according to exemplary embodiments.

FIG. 5 illustrates a flowchart of a method of obtaining a high-resolution image according to exemplary embodiments.

The method of obtaining a high-resolution image is described in detail with reference to FIG. 5.

In operation S510, an input image may be scaled and a first output image may be generated.

Although a resolution of the first output image is higher than a resolution of the input image, the first output image may be a high-resolution image with a low sharpness since a high frequency component is not sufficient.

In operation S520, a high frequency component may be extracted from the input image.

According to exemplary embodiments, a high frequency component of an image may include a Laplacian signal.

In this instance, in operation S520, the high frequency component may be extracted from the input image according to Equation 1. Also, when the high frequency component includes the Laplacian signal, the Laplacian signal may be extracted from an input signal using a kernel or a mask corresponding to Equation 2 in operation S520.

In operation S530, the extracted high frequency component may be scaled and a first high frequency component of the first output image may be extracted.

In operation S540, a second high frequency component of the first output image may be generated based on the first high frequency component. Specifically, the second high frequency component may be generated using only data included in a current image, without using additional data in operation S540.

According to exemplary embodiments, in operation S540, a ratio (magnitude ratio) between a magnitude of the first high frequency component and a magnitude of the second high frequency component may be estimated based on the first high frequency component, which is not illustrated in FIG. 5. In this instance, a second high frequency component may be generated based on the estimated magnitude ratio in operation S540.

According to exemplary embodiments, when estimating the magnitude ratio, the second high frequency component may be extracted by multiplying the magnitude ratio with the first high frequency component extracted in operation S530. In this instance, the magnitude ratio may be determined by Equation 3.

As described above, since the high frequency component of the image may include the Laplacian signal, the first high frequency component may include a first Laplacian signal and the second high frequency component may include a second Laplacian signal.

According to exemplary embodiments, in operation S540, a first Gaussian distribution may be generated based on a variance value of the gradient distribution. The variance value of the gradient distribution may be extracted from an edge of the first output image. Also, in operation S540, a second Gaussian distribution may be generated based on the first variance value. In this instance, the first Gaussian distribution may have a first variance value, and the second Gaussian distribution may have a second variance value. Also, the magnitude ratio may be estimated based on the first Gaussian distribution and the second Gaussian distribution.

As described above, the Laplacian signal, which is the high frequency component of the image, may be extracted by differentiating a gradient component in the edge, and the gradient distribution in the edge may be modeled as the Gaussian distribution. Accordingly, when estimating the magnitude ratio, the ratio between the magnitude of the first high frequency component and the magnitude of the second high frequency component may be estimated using the modeled Gaussian distribution.

Also, the Laplacian signal may be extracted by differentiating the gradient component. Thus, according to exemplary embodiments, the magnitude ratio may be a ratio between a derivative of the first Gaussian distribution and a derivative of the second Gaussian distribution.

Also, according to exemplary embodiments, the first Gaussian distribution may correspond to a first GGD, and the second Gaussian distribution may correspond to a second GGD.

In this instance, the first GGD and the second GGD may be represented as Equation 8.

In this instance, the magnitude ratio may be determined by Equation 9.

In operation S550, the first output image and the second high frequency component may be synthesized, and a second output image may be generated. Accordingly, the second output image which is a high-resolution image where the high frequency component is enhanced may be obtained.

Figure 6:
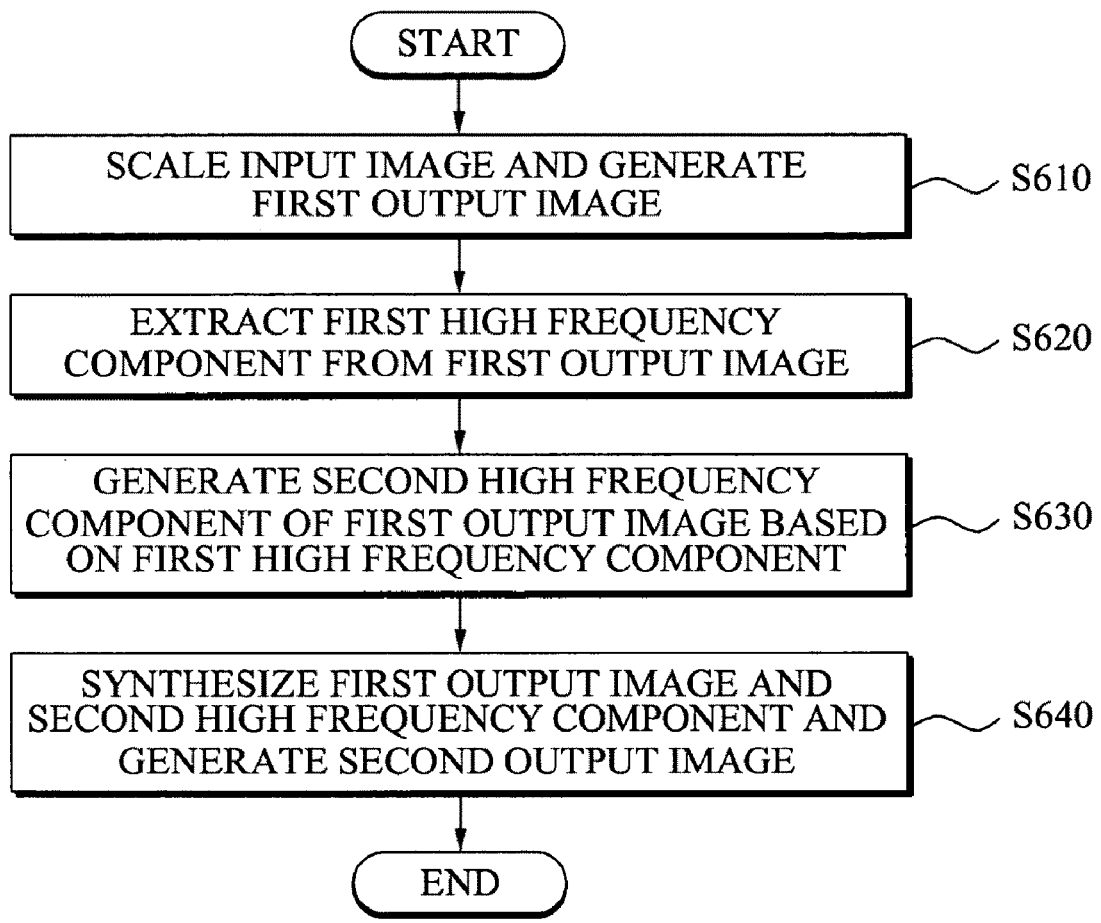
FIG. 6 illustrates a flowchart of a method of obtaining a high-resolution image according to other exemplary embodiments.

FIG. 6 illustrates a flowchart of a method of obtaining a high-resolution image according to other exemplary embodiments.

The method of obtaining a high-resolution image according to other exemplary embodiments is described in detail with reference to FIG. 6.

In operation S610, an input image may be scaled and a first output image may be generated.

In operation S620, a first high frequency component may be extracted from the first output image. That is, in operation S620, the first high frequency component may be directly extracted from the first output image. In this instance, the first high frequency component may be extracted by applying the first output image to Equation 1 or applying the first output image to a kernel corresponding to Equation 2.

In operation S630, a second high frequency component of the first output image may be generated based on the first high frequency component. In operation S640, the first output image and the second high frequency component may be synthesized, and a second output image may be generated.

The method of obtaining a high-resolution image according to other exemplary embodiments has been described. The apparatus of obtaining a high-resolution image that has been described with reference to FIG. 1 and FIG. 2 may be applied to the method of obtaining a high-resolution image. Accordingly, further detailed descriptions will be omitted herein.

The method of obtaining a high-resolution image according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. An apparatus for obtaining a high-resolution image, the apparatus comprising:
    a scaler to scale an input image and generate a first output image, the first output image having a resolution greater than a resolution of the input image;
    a high frequency component extraction unit to extract a first high frequency component of the first output image from the input image;
    a high frequency component generation unit to generate a second high frequency component of the first output image based on the first high frequency component; and an image synthesis unit to synthesize the first output image and the second high frequency component and to generate a second output image, the second output image having a resolution greater than the resolution of the input image, wherein the image synthesis unit includes at least one processor to synthesize the first output image and the second high frequency component.

2. The apparatus of claim 1, wherein the high frequency component extraction unit scales a high frequency component of the input image to extract the first high frequency component.

3. The apparatus of claim 1, wherein the high frequency component generation unit estimates a ratio between a magnitude of the first high frequency component and a magnitude of the second high frequency component based on the first high frequency component, and generates the second high frequency component based on the ratio.

4. The apparatus of claim 3, wherein the high frequency component generation unit multiplies the first high frequency component with the ratio to generate the second high frequency component.

5. The apparatus of claim 1, wherein the first high frequency component includes a first Laplacian signal, and the second high frequency component includes a second Laplacian signal.

6. The apparatus of claim 3, wherein the high frequency component generation unit generates a first Gaussian distribution having a first variance value based on a variance value of a gradient distribution, generates a second Gaussian distribution having a second variance value based on the first variance value, and estimates the ratio based on the first Gaussian distribution and the second Gaussian distribution, the variance value of the gradient distribution being extracted from an edge of the first output image.

7. The apparatus of claim 6, wherein the ratio is a ratio between a derivative of the first Gaussian distribution and a derivative of the second Gaussian distribution.

8. The apparatus of claim 6, wherein the second variance value is less than the first variance value.

9. The apparatus of claim 6, wherein the high frequency component generation unit detects the gradient distribution based on a gradient map of the first output image and an edge map of the first output image.

10. The apparatus of claim 6, wherein each of the first Gaussian distribution and the second Gaussian distribution is a generalized Gaussian distribution (GGD).

11. An apparatus for obtaining a high-resolution image, the apparatus comprising:
a scaler to scale an input image and generate a first output image, the first output image having a resolution greater than a resolution of the input image;
a high frequency component generation unit to extract a first high frequency component from the first output image, and generate a second high frequency component of the first output image based on the first high frequency component; and
an image synthesis unit to synthesize the first output image and the second high frequency component and to generate a second output image, the second output image having a resolution greater than the resolution of the input image,
wherein the image synthesis unit includes at least one processor to synthesize the first output image and the second high frequency component.

12. The apparatus of claim 11, wherein the high frequency component generation unit estimates a ratio between a magnitude of the first high frequency component and a magnitude of the second high frequency component based on the first high frequency component, and generates the second high frequency component based on the ratio.

13. The apparatus of claim 12, wherein the high frequency component generation unit multiplies the first high frequency component with the ratio to generate the second high frequency component.

14. The apparatus of claim 12, wherein the first high frequency component includes a first Laplacian signal, and the second high frequency component includes a second Laplacian signal.

15. The apparatus of claim 12, wherein the high frequency component generation unit generates a first Gaussian distribution having a first variance value based on a variance value of a gradient distribution, generates a second Gaussian distribution having a second variance value based on the first variance value, and estimates the ratio based on the first Gaussian distribution and the second Gaussian distribution, the variance value of the gradient distribution being extracted from an edge of the first output image.

16. The apparatus of claim 15, wherein the ratio is a ratio between a derivative of the first Gaussian distribution and a derivative of the second Gaussian distribution.

17. The apparatus of claim 15, wherein the second variance value is less than the first variance value.

18. The apparatus of claim 15, wherein the high frequency component generation unit detects the gradient distribution based on a gradient map of the first output image and an edge map of the first output image.

19. The apparatus of claim 15, wherein each of the first Gaussian distribution and the second Gaussian distribution is a generalized Gaussian distribution (GGD).

20. A method of obtaining a high-resolution image, the method comprising:
scaling an input image and generating a first output image, the first output image having a resolution greater than a resolution of the input image;
extracting a first high frequency component of the first output image from the input image;
generating a second high frequency component of the first output image based on the first high frequency component; and
synthesizing the first output image and the second high frequency component and generating a second output image, the second output image having a resolution greater than the resolution of the input image,
wherein the method is performed using at least one processor.

21. The method of claim 20, wherein the extracting scales a high frequency component of the input image to extract the first high frequency component.

22. The method of claim 20, wherein the generating of the second high frequency component comprises:
estimating a ratio between a magnitude of the first high frequency component and a magnitude of the second high frequency component based on the first high frequency component,
wherein the second high frequency component is generated based on the ratio.

23. The method of claim 22, wherein the estimating comprises:
generating a first Gaussian distribution having a first variance value based on a variance value of a gradient distribution, the variance value of the gradient distribution being extracted from an edge of the first output image; and generating a second Gaussian distribution having a second variance value based on the first variance value, wherein the ratio is estimated based on the first Gaussian distribution and the second Gaussian distribution.

24. The method of claim 23, wherein the ratio is a ratio between a derivative of the first Gaussian distribution and a derivative of the second Gaussian distribution.

25. The method of claim 23, wherein the second variance value is less than the first variance value.

26. The method of claim 23, wherein each of the first Gaussian distribution and the second Gaussian distribution is a generalized Gaussian distribution (GGD).

27. A method of obtaining a high-resolution image, the method comprising:

scaling an input image and generating a first output image, the first output image having a resolution greater than a resolution of the input image;

extracting a first high frequency component from the first output image, and generating a second high frequency component of the first output image based on the first high frequency component; and synthesizing the first output image and the second high frequency component and generating a second output image, the second output image having a resolution greater than the resolution of the input image, wherein the method is performed using at least one processor.

28. The method of claim 27, wherein the generating of the second high frequency component comprises:

estimating a ratio between a magnitude of the first high frequency component and a magnitude of the second high frequency component based on the first high frequency component, wherein the second high frequency component is generated based on the ratio.

29. The method of claim 28, wherein the estimating comprises:

generating a first Gaussian distribution having a first variance value based on a variance value of a gradient distribution, the variance value of the gradient distribution being extracted from an edge of the first output image; and generating a second Gaussian distribution having a second variance value based on the first variance value, wherein the ratio is estimated based on the first Gaussian distribution and the second Gaussian distribution.

30. The method of claim 28, wherein the ratio is a ratio between a derivative of the first Gaussian distribution and a derivative of the second Gaussian distribution.

31. The method of claim 28, wherein the second variance value is less than the first variance value.

32. The method of claim 28, wherein each of the first Gaussian distribution and the second Gaussian distribution is a generalized Gaussian distribution (GGD).

33. A non-transitory computer-readable recording medium storing a program for implementing a method of obtaining a high-resolution image, the method comprising:

scaling an input image and generating a first output image, the first output image having a resolution greater than a resolution of the input image;

extracting a first high frequency component of the first output image from the input image;

generating a second high frequency component of the first output image based on the first high frequency component; and synthesizing the first output image and the second high frequency component and generating a second output image, the second output image having a resolution greater than the resolution of the input image, wherein the method is performed using at least one processor.

* * * * *